W. W. VIRDIN.
Mode of Braking Locomotive Engines on Railroads.
No. 24,680.
Patented July 5, 1859.
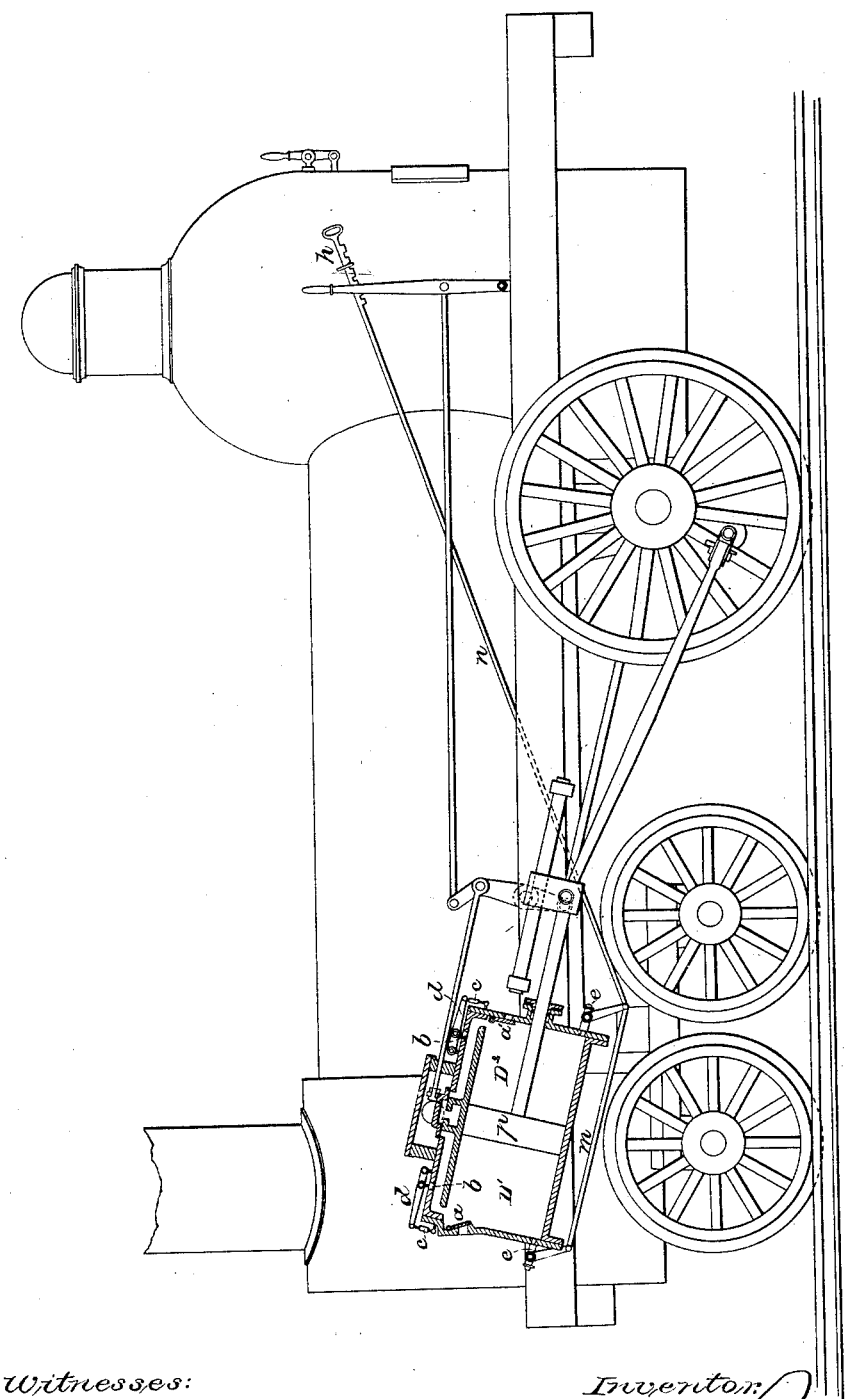

UNITED STATES PATENT OFFICE.

WILLIAM W. VIRDIN, OF BALTIMORE, MARYLAND.

IMPROVEMENT IN THE MODE OF BRAKING LOCOMOTIVE-ENGINES ON RAILROADS.

Specification forming part of Letters Patent No. 24,680, dated July 5, 1859.

*To all whom it may concern:*

Be it known that I, WILLIAM W. VIRDIN, of the city and county of Baltimore, and State of Maryland, have invented certain new and useful Improvements in the Construction of Locomotives; and I do hereby declare the following to be a full, clear, and exact description of the construction and operation of the same, reference being had to the accompanying drawing, forming part of this specification, which is a side elevation of a locomotive, the cylinder, steam-chest, &c., being shown in section.

The locomotive is of ordinary construction, with the addition of certain parts or appendages which are the subjects of my improvements and hereinafter specifically described. Upon each end of the cylinder is a valve opening inward, marked $a$ and $a'$.

The effect of the improvement is this: To stop the train, throw the engine out of gear, and adjust the valve so as to close the ports in the steam-chest, leaving the throttle-valve open, so that the pressure of the steam will be fully bearing on the valve in the steam-chest. The momentum of the engine and train works the piston in the cylinder. When the piston moves from the compartment $D'$, the valve $a$ opens and the air rushes in to fill the vacuum. Upon the return of the piston the valve $a$ closes and the valve $a'$ opens, admitting the air into the compartment $D^2$, and so on continuously. As the air in the compartment becomes more and more compressed by the working of the piston, the headway of the train is gradually but surely overcome, and that too without the excessive wear of the rail caused by the reversal of the motion of the wheel. The cocks $e$ $e'$ in the ends of the cylinder control the extent of compression of the air. They are the waste-water cocks of the ordinary cylinder enlarged, and act as auxiliary to the valves $b$ and $b'$, which are pressure-gage valves, to indicate the extent of compression of the air in the compartments.

The ingress of air through the valves $a$ and $a'$ may be controlled by valves upon the outside of the cylinder over the openings of the valves $a$ and $a'$, which valves, and also the valves $b$ and $b'$, though described here, may not be necessary.

What I claim as my invention, and desire to secure by Letters Patent, is—

The introduction of air into the cylinders of locomotives in the manner as hereinbefore set forth, and for the purpose of offering a yielding resistance to the movement of the piston, and by this resistance overcome the momentum of the train.

W. W. VIRDIN.

In presence of—
   E. R. SPRAGUE,
   THOS. B. BARNARD.